Figure 1:
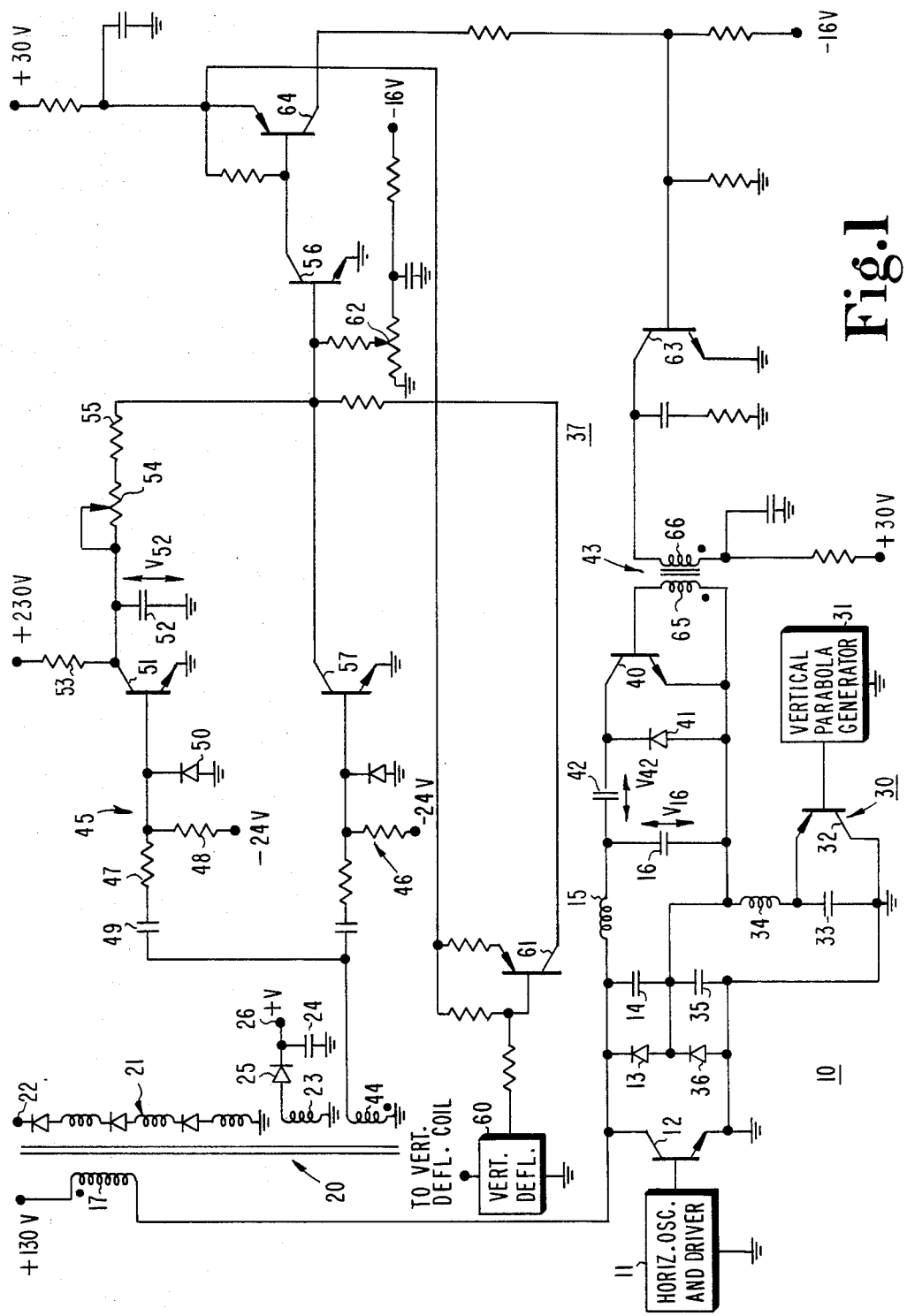

United States Patent [19]

Willis et al.

[11] Patent Number: 4,533,855

[45] Date of Patent: Aug. 6, 1985

[54] SWITCHED CAPACITOR S-CORRECTION CIRCUIT

[75] Inventors: Donald H. Willis; David W. Luz, both of Indianapolis, Ind.

[73] Assignee: RCA Corporation, Princeton, N.J.

[21] Appl. No.: 562,246

[22] Filed: Dec. 16, 1983

[51] Int. Cl.³ .................... H01J 29/70; H01J 29/76
[52] U.S. Cl. ................................ 315/370; 315/408
[58] Field of Search ............... 315/370, 371, 393, 408

[56] References Cited

U.S. PATENT DOCUMENTS

| | | | |
|---|---|---|---|
| 4,019,093 | 4/1977 | Klein | 315/408 |
| 4,176,303 | 11/1979 | Babcock et al. | 315/400 |
| 4,181,874 | 1/1980 | Babcock | 315/370 |
| 4,281,275 | 7/1981 | Chapman et al. | 315/399 |
| 4,329,729 | 5/1982 | Knight | 361/91 |

Primary Examiner—Theodore M. Blum
Attorney, Agent, or Firm—Paul J. Rasmussen; Joseph Laks; Scott J. Stevens

[57] ABSTRACT

An S-correction circuit for a video display apparatus provides switchable amounts of correction in a given line deflection interval in order to satisfy the requirements of cathode ray tubes having large deflection angles or complex curvature faceplates. A second S-shaping capacitor is coupled in parallel with the main S-shaping capacitor by action of a switching transistor. The time at which the transistor is switched may be controlled, for example, by modulating the switching point at a vertical rate, in order to increase the flexibility of the correction circuit.

9 Claims, 3 Drawing Figures

SWITCHED CAPACITOR S-CORRECTION CIRCUIT

This invention relates to correction of cathode ray tube geometry distortion, and in particular, to deflection current S-correction for cathode ray tubes having complex correction requirements.

The cathode ray tube of a video display apparatus incorporates an electron gun assembly which produces an electron beam or beams. The beams are deflected or scanned to form a raster on a phosphor display screen located on the inside surface of the front panel of the tube. The radius of curvature of the front panel is greater than the distance from the deflection center of the electron beams to the center of the display screen (i.e., the deflection distance). Because of the difference in radii, the electron beams travel a greater distance to the edges of the display screen than to the center of the screen. For a given amount of deflection, therefore, the beams will traverse a greater distance on the display screen near the edges than at the center of the screen. This causes the picture on the screen to appear stretched at the edges compared to the center. The solution to this problem has previously been the inclusion of a capacitor in series with the horizontal or line deflection winding. This capacitor has the effect of varying the amplitude of the horizontal deflection current, so that the sawtooth deflection current waveform resembles an "S" shape. This S-correction reduces the amount of deflection of the electron beams near the edges of the screen, thereby compensating for the previously described tube geometry distortion.

For picture tubes having large deflection angles, e.g., 110° or greater, or for tubes having an unconventional faceplate curvature, the previously described geometry correction may not be sufficient. For example, insufficient correction may occur with tubes having a front panel with a spherical radius of curvature greater than a conventional tube, or with tubes having a complex or compound faceplate curvature with multiple radii, such as is described in U.S. patent application Ser. No. 469,775, filed Feb. 25, 1983, in the names of D'Amato et al. and entitled "Cathode Ray Tube Having Different Curvatures Along Major and Minor Axes". With these tubes, a single S-shaping capacitor may not be able to provide the desired amount of correction at all screen locations, and may provide too much or too little correction at different regions of the screen.

The present invention is directed to an S-correction circuit that provides effective correction for tubes having large deflection angles or complex faceplate contours.

In accordance with the present invention, a horizontal or line deflection circuit comprise a horizontal deflection winding and a circuit for providing a deflection current in the winding defining a trace and a retrace interval. A first capacitor is coupled to the deflection winding and provides symmetrical linearity correction to the deflection current. A circuit couples a second capacitor to the deflection winding during a portion of the trace interval in order to modify the amount of linearity correction provided to the deflection current.

Figure 2:
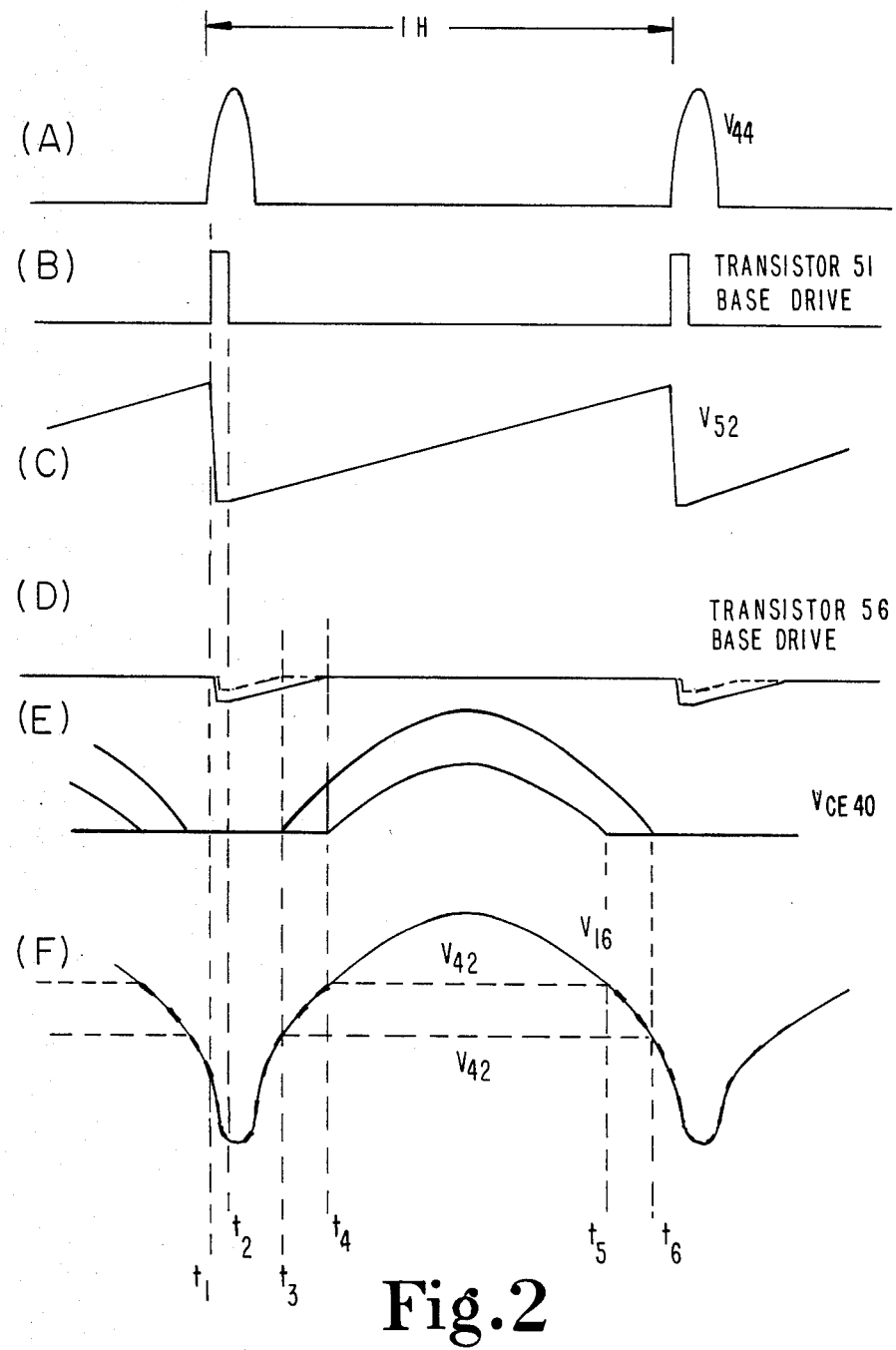
Figure 3:
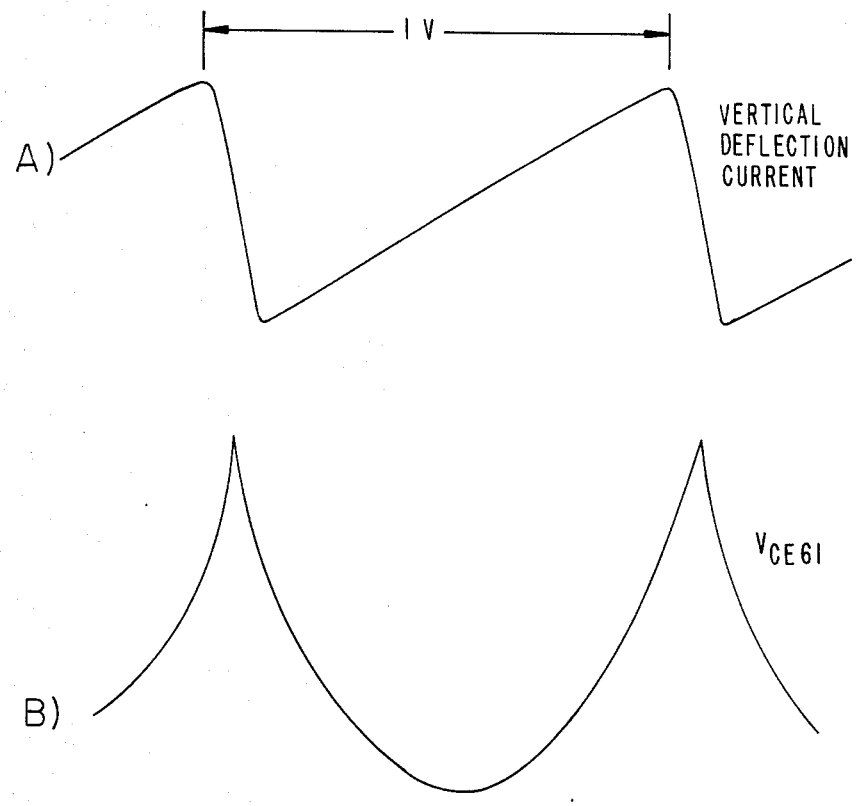

In the accompanying drawing,

FIG. 1 is a schematic and block diagram of a portion of a television receiver incorporating a correction circuit in accordance with an aspect of the present invention; and FIGS. 2 and 3 illustrate waveforms associated with the circuit of FIG. 1.

Referring to FIG. 1, there is shown a portion of a video display apparatus, such as a television receiver, incorporating a horizontal deflection circuit 10. The horizontal deflection circuit 10 includes horizontal oscillator and driver circuits 11 which apply switching signals to the base of a horizontal output transistor 12. Coupled to the horizontal output transistor 12 is a damper diode 13, a retrace capacitor 14, a horizontal deflection winding 15 and an S-shaping capacitor 16. Power is provided to the horizontal output circuit 10 from a power supply of the order of +130 volts via a primary winding 17 of a power transformer 20.

Power transformer 20 generates a source of high voltage at a terminal 22 via windings 21. The high voltage potential, of the order of 30 KV, is applied to the anode or ultor terminal of a kinescope (not shown). Power transformer 20 also provides power to other receiver circuits. This is illustratively shown in FIG. 1 by secondary winding 23, filter capacitor 24 and rectifying diode 25, which provides a voltage level designated +V at a terminal 26.

Horizontal deflection circuit 10 generates a sawtooth current in horizontal deflection winding 15 which in turn produces a deflection field which deflects the electron beams of the kinescope. The electron beams are deflected to form a raster on the display screen of the kinescope. Since the electron beams are deflected farther to the corners of the raster than to the edges, the sides of the raster will appear inwardly bowed or pincushion shaped.

In order to correct the previously described side, or east-west, pincushion distortion, horizontal deflection circuit 10 incorporates a diode modulator correction circuit 30 which modulates the horizontal deflection current at a vertical deflection rate in a parabolic manner. Diode modulator 30 incorporates a vertical parabola generator 31 which applies a parabolic vertical rate signal to a transistor 32. Diode modulator 30 also comprises a modulator capacitor 33, a modulator inductor 34, a modulator retrace capacitor 35 and a modulator diode 36. Conduction of transistor 32 controls the voltage across modulator capacitor 33 in order to vary the modulator capacitor voltage in a parabolic manner. This in turn varies the horizontal deflection trace voltage in order to provide side pincushion distortion correction.

As previously described, picture tubes having large deflection angles and/or compound curvature faceplates may require a more complex form of S-correction than is provided by the single S-shaping capacitor 16. In accordance with an aspect of the present invention, FIG. 1 illustrates an S-correction circuit 37 which provides effective S-correction for picture tubes having complex S-correction requirements. S-correction circuit 37 includes a switching transistor 40, a diode 41 and a capacitor 42. Switching of transistor 40 into conduction has the effect of placing capacitor 42 in parallel with S-shaping capacitor 16, thereby increasing the amount of circuit S-shaping capacitance. Two values of S-shaping capacitance may be presented to the horizontal deflection circuit; namely, the value of capacitor 16 and the value of the parallel combination of capacitors 16 and 42. This allows the amount of S-shaping correction to be changed for different portions of the horizontal deflection interval.

Switching pulses are applied to the base of transistor 40 via a transformer 43. Transformer 43 permits the application of a fixed amplitude pulse to the base of transistor 40 independent of the emitter voltage, which follows the pincushion correcting parabola voltage produced by diode modulator 30.

As previously described, certain cathode ray tube geometries or tubes having large deflection angles may require different amounts of S-correction during a given horizontal scan line. With some tubes, it may be sufficient to control the S-correction switching to occur at the same time during each horizontal deflection interval. Other tubes, for example those having a complex curvature faceplate, may have a contour that requires the S-correction switching to be advanced or retarded during the course of the vertical or field deflection interval. S-correction circuitry 37 of FIG. 1 produces switching pulses for transistor 40 which may be modulated with respect to their time of occurence within the horizontal deflection interval.

Horizontal retrace derived pulses, shown in FIG. 2A, produced across winding 44 of transformer 20, are applied to differentiator circuits 45 and 46. Differentiator circuit 45, comprising capacitor 49, resistors 47 and 48, and diode 50, differentiates the leading edges of the horizontal rate pulses from winding 44 in order to produce a short duration pulse, illustratively shown in FIG. 2B, that is used to turn transistor 51 on for approximately 5 microseconds.

Capacitor 52, together with resistor 53 and the +230 volt supply, form a ramp generator. Turn-on of transistor 51 causes capacitor 52 to discharge through transistor 51 to ground, thereby resetting the ramp. Capacitor 52 discharges very quickly, as shown in FIG. 2C, so that it is completely discharged before transistor 51 is turned off. When transistor 51 is turned off, capacitor 52 charges through resistor 53 to form a horizontal rate ramp signal, shown in FIG. 2C, that is applied via variable resistor 54 and resistor 55 to the base of a transistor 56. Variable resistor 54 controls the amplitude of the ramp signal that is applied to transistor 56.

Differentiator 46 produces a short duration pulse which turns transistor 57 on and off coincident with the switching of transistor 51. Conduction of transistor 57 rapidly removes the charge from the base region of transistor 56 so that transistor 56 turns off very quickly when the horizontal rate ramp is reset.

Vertical deflection circuit 60, in addition to generating a sawtooth vertical deflection current, shown in FIG. 3A, for a vertical deflection winding (not shown), provides a vertical rate parabolic voltage signal which is inverted by transistor 61 to form a signal as shown in FIG. 3B. This vertical rate parabolic voltage is added to the horizontal rate ramp voltage to form a signal, as shown in FIG. 2D, that is applied to the base of transistor 56. The vertical parabola voltage has the effect of changing the dc level of the horizontal ramp, as illustrated by the solid and dashed waveforms of FIG. 2D. This variation in dc level over the course of the vertical deflection interval modulates the turn on time of transistor 56 at a vertical rate. Variable resistor 62 is adjustable to set the dc bias on the base of transistor 56 in order to control the point at which transistor 56 switches. The circuit of FIG. 1 is illustratively configured to cause transistor 56 to turn on earlier in the horizontal deflection interval near the top and bottom of the scanned raster; i.e., where the vertical rate parabolic voltage is greatest. This is shown by the dashed waveform in FIG. 2D. A different cathode ray tube faceplate contour may, however, require a different modulation in which transistor 56 would turn on later during horizontal deflection intervals near the top and bottom of the raster. Such a requirement could be satisfied, for example, by removing transistor 61, which would eliminate the inversion of the parabolic voltage signal from vertical deflection circuit 60. Other circuit modifications to satisfy particular modulation requirements are, of course, possible.

Conduction of transistor 56 provides a low impedance current path which clamps the base drive signal, as shown in FIG. 2D. Conduction of transistor 56 also causes transistor 63 to conduct, via switching of gain-producing transistor 64. Conduction of transistor 63 causes current to flow in winding 66 of transformer 43 from the +30 volt supply, through winding 66 and transistor 63 to ground. This causes a current of flow in winding 65 of transformer 43 which, because of the coupling polarity of windings 65 and 66, will turn transistor 40 off. As can be seen in FIG. 2E, transistor 40 is turned off at time $t_3$ in response to the dashed waveform of FIG. 2D and at time $t_4$ in response to the solid waveform of FIG. 2D. This illustrates the modulation of the switching of transistor 40 in response to the level of the vertical parabola voltage signal. The turn off time of transistor 40 will occur during the first half of the horizontal trace interval. With transistor 40 turned off, the voltage across capacitor 42 will remain constant, as shown in FIG. 2F, while the voltage across S-shaping capacitor 16 continues to rise, as shown also in FIG. 2F. During the second half of the horizontal trace interval, the voltage across capacitor 16 begins to decrease. When the voltage across capacitor 16 equals the voltage across capacitor 42, diode 41 will begin to conduct, and capacitor 42 begins to discharge, thereby influencing the S-correction of the deflection current. Diode 41 will continue to conduct until the center of the horizontal retrace interval, when the direction of deflection current reverses. Resetting of the horizontal rate ramp voltage generated across capacitor 52 causes transistor 40 to begin conducting which in turn causes capacitor 42 to charge again, until transistor 40 is turned off as previously described. It is important that transistor 40 be turned on when its collector voltage is near zero in order to prevent a potentially damaging current surge in the transistor when it is turned on. To accomplish this objective, transistor 40 should be turned on when diode 41 is conducting.

The charge on capacitor 42, determined by the length of conduction of transistor 40, will also determine the time at which diode 41 begins to conduct after transistor 40 is turned off. As can be seen in FIG. 2F, the charge and discharge intervals of capacitor 42, hence the intervals when capacitor 42 contributes to S-correction, are symmetrical about the center of the horizontal trace interval for both transistor 40 turn off times of either $t_3$ or $t_4$. This occurs because the time at which diode 41 begins to conduct will always occur when the voltage level across capacitor 16 is equal to the same level as it was when transistor 40 was turned off. Symmetry of S-correction about the center of horizontal trace is therefore achieved regardless of the time at which transistor 40 is turned off.

The previously described S-correction circuit therefore provides switchable amounts of correction during a given line deflection interval. The point at which the S-correction switching occurs in a given line may be controlled in order to increase the flexibility of the correction circuit.

What is claimed is:

1. A line deflection circuit comprising:
   a line deflection winding:
   means for providing a deflection current in said line deflection winding defining deflection intervals having trace and retrace intervals;
   a first capacitor coupled to said deflection winding for providing linearity distortion correction to said deflection current;
   a second capacitor; and
   means for selectively coupling said second capacitor to said deflection winding during portions of each of said deflection intervals for supplying additional amounts of linearity distortion correction to said deflection current during each of said portions of said deflection intervals.

2. The arrangement defined in claim 1, wherein said means for coupling said second capacitor to said deflection winding comprises means for controlling the instant within said deflection interval that said coupling occurs.

3. The arrangement defined in claim 2, wherein said controlling means controls the time of coupling of said second capacitor to said deflection winding in response to a field deflection rate signal.

4. The arrangement defined in claim 1, wherein said means for coupling said second capacitor to said deflection winding comprises a switch coupled to said second capacitor for selectively completing a current path through said second capacitor when said switch is closed for coupling said second capacitor to said deflection winding and for preventing current flow through said capacitor when said switch is open for causing said second capacitor to be decoupled from said deflection winding.

5. The arrangement defined in claim 4, wherein said switch comprises a transistor, said transistor being rendered conductive when said switch is closed for causing the voltage level across said second capacitor to equal the voltage level across said first capacitor, said transistor being rendered nonconductive when said switch is open for causing the voltage level across said second capacitor to remain constant at the voltage level that is across said second capacitor when said transistor is rendered nonconductive.

6. The arrangement defined in claim 1, wherein said second capacitor is coupled in parallel with said first capacitor.

7. The arrangement defined in claim 1, wherein said second capacitor is coupled to said deflection winding during a first interval occurring during the first half of said trace interval and a second interval occurring during the second half of said trace interval.

8. The arrangement defined in claim 7, wherein said means for coupling said second capacitor to said deflection winding comprises means for maintaining the duration of said second interval substantially equal to the duration of said first interval in order to maintain symmetry of said linearity correction.

9. The arrangement defined in claim 8, wherein said means for maintaining said first and second interval durations equal comprises a diode for coupling said second capacitor to said deflection winding during one of said first and second intervals.

* * * * *